(No Model.)
C. P. CONRAD.
PUNCTURELESS PNEUMATIC TIRE.
No. 557,531. Patented Mar. 31, 1896.
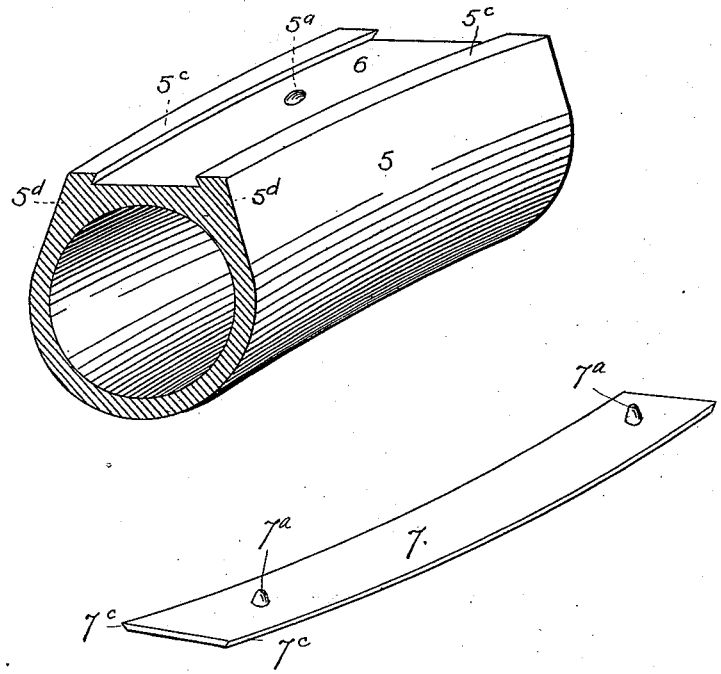
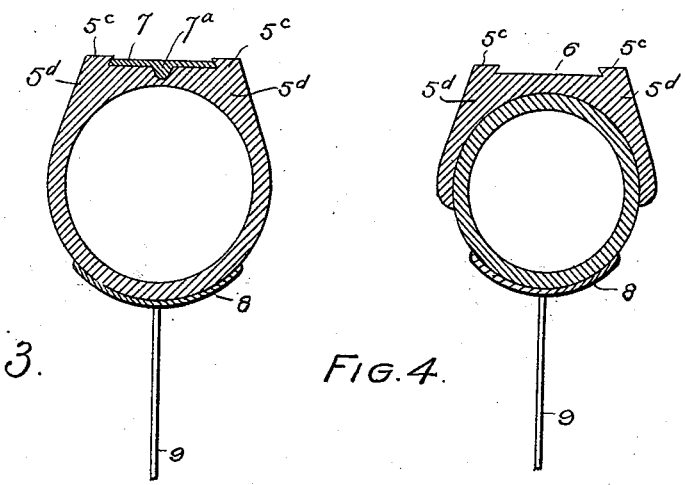
Witnesses
Inventor
C. P. Conrad
By his Attorney

UNITED STATES PATENT OFFICE.

CHARLES PAUL CONRAD, OF DENVER, COLORADO, ASSIGNOR OF TWO-THIRDS TO CHARLES T. CLYMER, HENRY THOMPSON, GUSTAVE BOELKE, WILLIAM CAPELLI, WILLIAM MAYER, AND FRANK BALLAT.

PUNCTURELESS PNEUMATIC TIRE.

SPECIFICATION forming part of Letters Patent No. 557,531, dated March 31, 1896.

Application filed October 18, 1895. Serial No. 566,063. (No model.)

*To all whom it may concern:*

Be it known that I, CHARLES PAUL CONRAD, a citizen of the United States of America, residing at Denver, in the county of Arapahoe and State of Colorado, have invented certain new and useful Improvements in Punctureless Pneumatic Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in pneumatic tires, and my object is to provide a tire of this class which cannot be punctured.

To this end the invention consists of the features hereinafter described and claimed, all of which will be fully understood by reference to the accompanying drawings, in which is illustrated an embodiment thereof.

In the drawings, Figure 1 is a fragmentary view in perspective of my improved tire with the metallic safety-band removed. Fig. 2 is a similar view of the metallic safety-band, shown in detail. Fig. 3 is a cross-section of the tire with the safety-band in place. Fig. 4 illustrates my improvement applied to the ordinary tire.

Similar reference-characters indicating corresponding parts in the views, let the numeral 5 designate the hood of the tire, which may be provided with an air-tube or not, as desired.

The tread of the tire is provided with a shallow dovetailed groove 6, in which is located an endless metallic band or ribbon 7, provided with short projections $7^a$ adapted to enter counterpart sockets $5^a$ formed in the hood of the tire and located at suitable intervals in the circumferential center of the groove. The edges of the metallic band are beveled, as shown at $7^c$, to fit the dovetail of the groove. The flanges $5^c$ of the hood preferably project, normally, slightly beyond the metallic band on each side of the groove, whereby the tire rests on the flanges until sufficient weight is applied to bring the band 7 to contact with the ground or other surface which the tire engages.

The metallic band is of sufficient width to protect that portion of the tread of the tire liable to puncture. The outer portions of the tread are formed of greater thickness or strength, as shown at $5^c$, to the end that there may be no danger of puncture in those parts.

The band 7 is held in place by the projections $7^a$ and the flanges $5^c$ of the hood. It will be readily understood, however, that there will be little or no tendency on the part of the band to slip from the tire when in use, since the pressure on the yielding flanges will cause them to grasp the band more tightly.

Though I have described the safety-band 7 as composed of metal, it must be understood that I do not limit the invention thereto, inasmuch as any material adapted to resist the penetration of sharp instruments may be employed. It is believed, however, that metal is preferable, and that aluminium is the best of metals for the purpose on account of its small specific gravity, and for the further reason that it is not liable to corrosion under ordinary circumstances.

My improvement may be applied to the ordinary tire by making it in the form of a false tread adapted to fit the tire and extending only part way round the same. (See Fig. 4.) The safety-band should be applied to the hood when it is quite soft or when the tire is partly inflated. When the band is in place the tire is fully inflated, whereby the band is secured tightly thereon.

In Figs. 3 and 4 the numeral 8 designates the rim, and 9 the spokes of the wheel to which the tire is applied.

Having thus described my invention, what I claim is—

1. In a pneumatic tire, the combination with the hood having a shallow open groove formed in its tread, and recesses or sockets formed in the bottom of the groove, of an endless band engaging the groove in the hood and of less thickness than the depth of the groove, whereby flanges $5^c$ of the hood normally project beyond the band on either side thereof, the band being provided with projections formed on its inner surface and adapted to enter recesses in the bottom of the groove, as and for the purpose set forth.

2. In a pneumatic tire, the combination with the hood having a shallow groove formed in its tread, and recesses or sockets formed in the bottom of the groove but not extending entirely through the fabric of the hood, of an endless band engaging the groove in the hood and of less thickness than the depth of the groove whereby flanges $5^c$ of the hood normally project beyond the band on either side thereof, the band being provided with projections formed on its inner surface and adapted to enter recesses in the bottom of the groove, as and for the purpose set forth.

3. In a pneumatic tire, the combination with the hood having a shallow dovetailed groove formed in its tread, and recesses or sockets formed in the bottom of the groove but not extending entirely through the fabric of the hood, of an endless band engaging the groove in the hood and of less thickness than the depth of the groove whereby flanges $5^c$ of the hood project beyond the band on either side thereof, the band being provided with beveled edges adapted to fit the dovetailed portions of the groove, and also provided with projections formed on its inner surface adapted to enter the recesses in the bottom of the groove, as and for the purpose set forth.

In testimony whereof I affix my signature in the presence of two witnesses.

CHARLES PAUL CONRAD.

Witnesses:
CHAS. E. DAWSON,
A. J. O'BRIEN.